(12) United States Patent
Koyama et al.

(10) Patent No.: US 6,325,919 B1
(45) Date of Patent: Dec. 4, 2001

(54) CATALYST SUPPORT, CATALYST, REACTOR FOR HYDROGENATION REACTION, AND CATALYTIC REACTION METHOD

(75) Inventors: Hiroki Koyama; Kenji Nakamura; Masayuki Kawaguchi; Yasuyuki Mashimo, all of Toda (JP)

(73) Assignee: Japan Energy Corportion, Tokyo (JP)

( * ) Notice: Subject to any disclaimer, the term of this patent is extended or adjusted under 35 U.S.C. 154(b) by 0 days.

(21) Appl. No.: 09/529,493

(22) PCT Filed: Oct. 15, 1998

(86) PCT No.: PCT/JP98/04639

§ 371 Date: Apr. 14, 2000

§ 102(e) Date: Apr. 14, 2000

(87) PCT Pub. No.: WO99/19065

PCT Pub. Date: Apr. 22, 1999

(30) Foreign Application Priority Data

Oct. 14, 1997 (JP) .................................................... 9-295006

(51) Int. Cl.$^7$ .................................................. C10G 35/04
(52) U.S. Cl. .......................... 208/134; 502/305; 502/325; 502/537; 502/535; 502/527.14; 502/527.16; 502/523; 502/527.4
(58) Field of Search ........................ 502/527.14, 527.16, 502/527.24, 305

(56) References Cited

U.S. PATENT DOCUMENTS 4,441,990 * 4/1984 Huang .................................. 208/111
4,656,157 * 4/1987 Hofmann et al. ..................... 502/435

FOREIGN PATENT DOCUMENTS

| 1323064 | 7/1973 | (JP) . |
| 5276553 | 12/1975 | (JP) . |
| B1-5420475 | 7/1979 | (JP) . |
| 58-214346 | 12/1983 | (JP) . |
| 61-141933 | 6/1986 | (JP) . |
| 6-134317 | 5/1994 | (JP) . |
| 6-170232 | 6/1994 | (JP) . |
| 6-198185 | 7/1994 | (JP) . |
| 6-210184 | 8/1994 | (JP) . |

OTHER PUBLICATIONS

Cooper et al., Oil & Gas Journal, pp. 39–44 (1986).
Fulton, Chemical Engineering, pp. 101 (1986).

* cited by examiner

Primary Examiner—Helane E. Myers
(74) Attorney, Agent, or Firm—Birch, Stewart, Kolasch & Birch, LLP (57) ABSTRACT

A catalyst carrier composed of a refractory inorganic oxide has a rotationally symmetrical shape having a hollow portion, such as a doughnut shape. An outer peripheral surface and the inner peripheral surface separating the hollow portion are linked by curved surfaces, and the height h of the carrier along the rotational symmetry axis is less than the outer diameter $D_o$ of the carrier. Using a catalyst having this carrier shape for a fixed bed makes it possible to prevent granular substances from causing catalyst plugging, and catalyst life can be extended because the catalyst-induced differential pressure increase is low even when granular substances accumulate on the catalyst. It is also possible to prevent the reaction fluid from undergoing channeling. Also provided is a hydrogenation reactor whose fixed bed is packed with the catalyst.

14 Claims, 8 Drawing Sheets

CATALYST SUPPORT, CATALYST, REACTOR FOR HYDROGENATION REACTION, AND CATALYTIC REACTION METHOD

This application is the national phase under 35 U.S.C. § 371 of PCT International Application No. PCT/JP98/04639 which has an International filing date of Oct. 14, 1998, which designated the United States of America.

TECHNICAL FIELD

The present invention relates to a catalyst carrier having a novel shape, a catalyst featuring this carrier, a fixed-bed reactor packed with this catalyst, and a catalytic reaction method for feeding a reaction fluid containing a granular substance to this reactor and initiating a reaction with this reaction fluid.

BACKGROUND ART

Fixed-bed reactors packed with catalysts are often used in chemical plants, oil refineries, and other facilities where catalytic reactions are performed. In such fixed-bed reactors, the spaces between the catalyst particles tend to be plugged by the granular substances transported by fluids (starting materials for the reactions) or by the granular substances formed as reaction by-products, making it impossible to perform the desired catalytic reactions.

In conventional practice, such catalyst plugging is prevented by packing the top portion of a reactor (upstream portion or the area near the inlet for the feed stocks of the reaction) or the entire reactor with highly porous pipe-shaped catalysts (so-called Raschig ring catalysts) or catalysts having a trefoil or quatrefoil shape in cross section. These catalysts are commonly manufactured by supporting metal components on catalyst carriers that have been extrusion-shaped to the desired shape. Another widely used method of preventing catalyst plugging is so-called size grading, according to which a reactor is packed with catalysts such that the catalyst size gradually decreases in the direction from the upstream to the downstream of the reactor.

For example, Japanese Patent Application Laid-open No. 6-198185 discloses a hydrodesulfurization catalyst shaped and baked such that the catalyst diameter/catalyst length ratio is kept within a range of 1:1 to 1:3 in order to reduce the pressure loss of the feed stock components passing through the catalyst, and reduce the bulk density of the catalyst.

Variously shaped catalyst pellets are also disclosed in "Selecting the Catalyst Configuration" (*Chemical Engineering*, May 12, 1986; pp. 97–101). Described in this report is the relation between the pressure loss or efficiency of a catalyst and the inner/outer diameter ratio of hollow pellets.

In addition, catalysts provided with cylindrical, trefoil, cinquefoil, annular, and other configurations and used for the hydrogenation of heavy oil are disclosed in the Technology section of *Oil & Gas Journal* (Dec. 8, 1986; pp. 39–44), and the effect of these configurations on the pressure loss or catalytic activity is discussed.

The inventors believe, however, that conventional catalysts shaped with the aim of achieving increased porosity in the above-described manner cause reaction fluids to undergo channeling when these reaction fluids pass through the catalysts. Such channeling is primarily attributed to the following three factors. First, a Raschig ring catalyst or an extrusion-formed catalyst having a trefoil or quatrefoil cross-sectional shape makes it easier for fluids to flow in the longitudinal direction of the catalyst. Second, common packing methods in which the catalyst is packed into a reactor without being oriented in a specific direction are characterized by the fact that the longitudinal direction of the packed catalysts tends to be partially aligned in a specific direction. When channeling occurs, only that portion of the catalyst packed into the reactor through which the reaction fluid passes can be efficiently used, resulting in lower catalytic reaction efficiency. In addition, hot spots are formed in the catalyst when the catalytic reaction is highly exothermic, and coke is produced by pyrolysis (sometimes resulting in so-called coking) when the reaction fluid is heavy oil.

In addition, the aforementioned size grading is disadvantageous in that because the catalyst size must gradually increase in the upstream direction of the catalyst layer, catalytic activity decreases and catalyst life is reduced when reactions in which the diffusion of reactants into catalyst pores is the rate determining step of the reaction process occur upstream of the catalyst layer or reactor (for example, in the case of a hydrodemetallation reaction involving heavy oil).

An object of the present invention, which was achieved in order to overcome the above-described shortcomings of conventional method and catalyst, is to provide a catalyst carrier, a catalyst obtained using this carrier and a hydrogenation reactor, which are capable of reducing the channeling of the reaction fluid in the reactor.

Another object of the present invention is to provide a catalyst carrier that makes it less likely that the catalyst will be plugged by the granular substance in the reaction fluid and that allows high catalytic activity to be maintained for a long time, to provide a catalyst obtained using this carrier, and to provide a fixed-bed reactor packed with this catalyst.

Yet another object of the present invention is to provide a catalytic reaction method that allows reactions to be performed without lowering the catalytic reaction efficiency as a result of catalyst plugging even in the case of a reaction fluid containing granular substances.

DISCLOSURE OF THE INVENTION

According to the first aspect of the present invention, a catalyst carrier composed of a refractory inorganic oxide is provided, wherein this catalyst carrier has rotational symmetry and a hollow portion formed along a rotational symmetry axis;

an outer peripheral surface, and the inner peripheral surface defined by this hollow portion are linked by curved surfaces; and the height of the carrier along the rotational symmetry axis is less than the outer diameter of the carrier.

The catalyst carrier of the present invention has a rotationally symmetrical configuration such as that typified by a doughnut shape, for example. This carrier shape allows porosity to be increased and the catalyst to be prevented from being plugged by a granular substance contained in the reaction fluid or produced by the reaction when the catalyst is packed into a fixed layer. In addition, catalyst life can be extended because the catalyst-induced increase in differential pressure (pressure loss) caused by the packed catalyst is reduced even when granular substance is deposited on the catalyst. Another feature of the catalyst carrier according to the present invention is that the height h along the symmetry axis is less than the outer diameter $D_o$ in the manner shown in FIG. 1B, so the fluid is less likely to flow along the symmetry axis of the catalyst and the catalyst has low directionality when packed, making it possible to prevent the channeling of the reaction fluid.

In addition, forming a hollow portion in the catalyst carrier of the present invention makes it possible to increase the outer surface area even when the porosity is high, whereas keeping the height h low in the direction of the symmetry axis makes it possible to keep the equivalent diameter at a low level, and hence to obtain comparatively high catalytic activity.

Figure 2A:
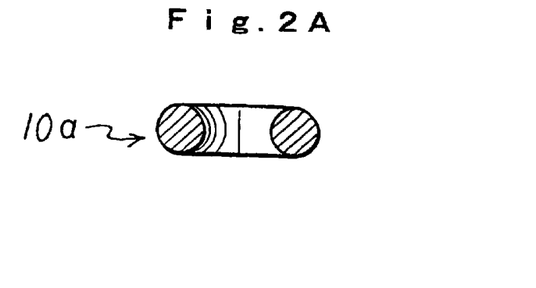
FIGS. 2A to 2G are diagrams depicting specific examples of the various cross-sectional shapes assumed by the catalyst carrier pertaining to the present invention.

In the catalyst carrier of the present invention, the diameter of the hollow portion (that is, the inner diameter $D_i$ of the carrier) can be made substantially equal to the height h in the direction of the rotational symmetry axis. In addition, the height h can be made 0.2 to 0.6 times that of the aforementioned outer diameter $D_o$. The cross-sectional configuration containing the rotational symmetry axis may be a circle (FIG. 2A), a semi-ellipse (FIG. 2B), an oval (FIG. 2E), a semicircle (FIG. 2D), an ellipse (FIG. 2E), a quarter ellipse (FIG. 2G), or a fan shape or a quadrangle with curved corner portions.

According to the second aspect of the present invention, a hydrogenation catalyst is provided by supporting catalyst components on a carrier composed of a refractory inorganic oxide, wherein this catalyst is has rotational symmetry and a hollow portion formed along a rotational symmetry axis;

an outer peripheral surface, and the inner peripheral surface defined by this hollow portion are linked by curved surfaces; and the height of the catalyst along the rotational symmetry axis is less than the outer diameter of the catalyst.

Similar to the above-described catalyst carrier, the catalyst of the present invention has the following advantages: i) high porosity during catalyst packing, ii) reduced catalyst plugging by granular substances, iii) low catalyst pressure loss, and iv) reduced channeling of the reaction fluid.

According to the third aspect of the present invention, a hydrogenation reactor is provided, having a fixed bed in which a catalyst is packed according to the present invention.

In the hydrogenation reactor obtained in accordance with the present invention, the liquid components of a reaction fluid are less likely to undergo channeling because the apparatus is packed with the catalyst of the present invention. As a result, the reaction fluid maintains uniform contact with the catalyst close-packed into the fixed bed, and higher catalytic reaction efficiency results. In addition, the operating time can be extended without plugging the catalyst because pressure loss is comparatively low even when the granular substances contained in heavy oil and other reaction fluids deposit on the catalyst. In particular, this approach is effective in a reactor of the type in which the catalyst must be packed in regular orientation. In addition, the hydrogenation reactor pertaining to the present invention operates in a highly efficient manner when a mixed gas-liquid phase (for example, heavy oil) is present in the reactor. Furthermore, the equivalent diameter of the catalyst can be reduced when the pressure loss of the catalyst is the same, making it possible to increase catalyst activity or to prolong catalyst life during the hydrodemetallation of heavy oil and other reactions in which diffusion is the rate determining step.

According to the fourth aspect of the present invention, a catalytic reaction method is provided such that a reaction fluid containing a granular substance is introduced into a fixed bed packed with a catalyst in accordance with the present invention, and a catalytic reaction is performed. Using this method allows the reaction fluid to be prevented from channeling, making it possible to simplify the structure of the reactor and to fabricate the reactor characterized by high reaction efficiency. For example, a common hydrogenation reactor is equipped with a dispersing apparatus for dispersing the reaction fluid, but the reactor of the present invention can dispense with the need for such a dispersing apparatus. Another feature of the reactor pertaining to the present invention is that the reactor can be made longer than in a conventional reactor because the granular substance produces little plugging and the pressure loss is low.

BEST MODE FOR CARRYING OUT THE INVENTION

With reference to appropriate drawings, the materials, configurations, and catalytically active components of the catalyst and catalyst carrier of the present invention will first be described and the reactor will then be described.

Materials of Catalyst Carrier

The catalyst carrier of the present invention is composed of a refractory inorganic oxide. The refractory inorganic oxide is a material that has adequate mechanical strength and chemical stability at the reaction temperature of the catalyst. Examples include alumina, alumina-silica, and materials obtained by adding zeolites and other complex oxides thereto. Of these materials, a material whose specific surface (as measured by nitrogen adsorption method) is 100 to 300 $m^2/g$ is preferred because it allows high catalytic activity to be achieved.

Configuration of Catalyst Carrier

The catalyst carrier pertaining to the present invention has a rotationally symmetrical shape containing a hollow portion. As referred to in the present specification, "a rotationally symmetrical carrier configuration" refers not only to a circle whose cross-sectional shape (external shape) is symmetrical about a rotational symmetry axis in a cross section orthogonal to the rotational symmetry axis, but also to a triangular, quadrangular, pentagonal, or other polygonal shape; to a trefoil, quatrefoil, cinquefoil, or other multifoil shape; or to an ellipsis symmetrical about a rotational symmetry axis. In other words, it can be any shape as long as rotating the catalyst carrier no more than 180 degrees about the rotational symmetry axis will produce substantially the same cross-sectional shape after the rotation as before the rotation.

Figure 1A:
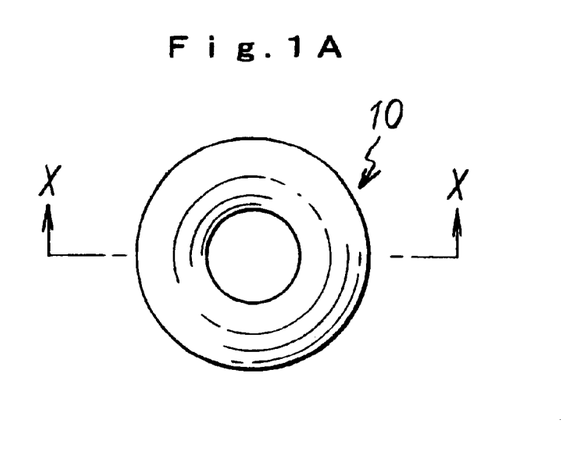
FIG. 1A is a plan view of a doughnut-shaped catalyst carrier pertaining to the present invention.
Figure 1B:
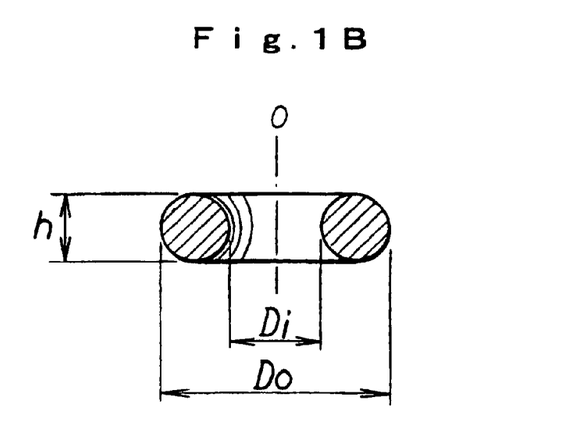
FIG. 1B is a cross section along X—X in FIG. 1A.
Figure 1C:
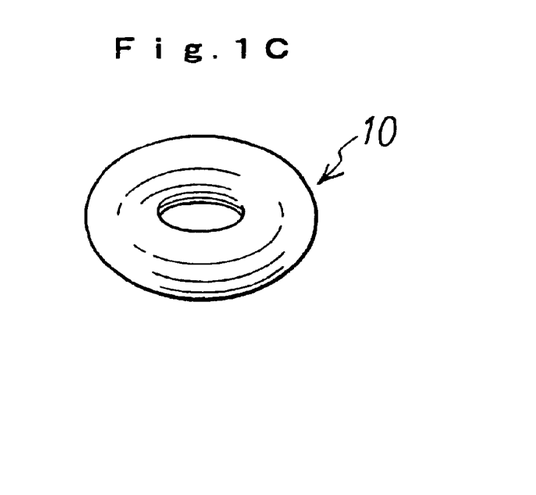
FIG. 1C is a perspective view of the doughnut-shaped carrier shown in FIG. 1A.

The shape of the catalyst carrier pertaining to the present invention will now be described with reference to the doughnut-shaped carrier 10 shown in FIGS. 1A and 1C. As shown in FIG. 1B, which is a cross section along X—X in FIG. 1A, the carrier of the present invention satisfies the condition $h \leq D_o$, where h is the maximum width, or height, along the rotational symmetry axis O, and $D_i$ and $D_o$ are the inner and outer diameters, respectively. In particular, the condition $0.2D_o \leq h \leq 0.6D_o$ is preferred for the adequate suppression of channeling in the reaction fluid flowing above or through a packed catalyst. Values obtained by averaging the length dimensions h, $D_i$, and $D_o$ measured in the course of a 360-degree turn may be used when the carrier, rather than having the doughnut shape shown in FIG. 1, has a shape whose length dimensions vary with the angle of rotation when the carrier is turned about the rotational symmetry axis (for example, when the carrier is a triangular or quadrangular column having a hollow portion). Specifically, the terms "outer diameter" and "inner diameter" used herein in relation to the carrier refer to the average rotational length dimensions of the inner and outer peripheries in a direction orthogonal to the rotational symmetry axis. When the outer diameter of the carrier varies in the direction of the rotational symmetry axis, the maximum outer diameter in the direction of the rotational symmetry axis is adopted as the outer diameter value. When the inner diameter of the carrier varies in the direction of the rotational symmetry axis, the minimum inner diameter in the direction of the rotational symmetry axis is adopted as the inner diameter value.

It is preferred that the height h and the inner diameter $D_i$ of the hollow portion have a similar magnitude to each other, for example, $0.5h \leq D_i \leq 3h$, and particularly $h \leq D_i \leq 2h$, in order to achieve higher catalyst porosity. In addition, the relation between the inner diameter $D_i$ and the outer diameter $D_o$ should preferably fall within a range of $0.3D_o \leq D_i 0.6D_o$ in order to achieve higher porosity. However, the equivalent spherical diameter and porosity of the catalyst can be independently designed by controlling the outer diameter/inner diameter ratio and the surface area of the cross section containing the symmetry axis, making it possible to adequately adjust the inner diameter $D_i$ and the outer diameter $D_o$ and to fabricate a catalyst that has high porosity but a small equivalent spherical diameter. As used herein, the term "equivalent spherical diameter" refers to the expression "6×Catalyst volume÷Outer surface area of catalyst." The equivalent spherical diameter is a parameter expressing catalytic activity, which increases with reduced equivalent spherical diameter.

The carrier of the present invention is not limited to the doughnut-shaped carrier 10 depicted in FIGS. 1A to 1C and 2A and includes various shapes such as those depicted in the cross sections in FIGS. 2B to 2G. In the carrier 10b depicted in FIG. 2B, the cross-sectional shape containing a rotational symmetry center is a semi-elliptical shape. In the drawing, the inner peripheral surface $S_i$ defined by the hollow portion 40 and the outer peripheral surface $S_o$ are linked by a curved surface $S_c$ at the top, and a flat surface 60 at the bottom.

Figure 2B:
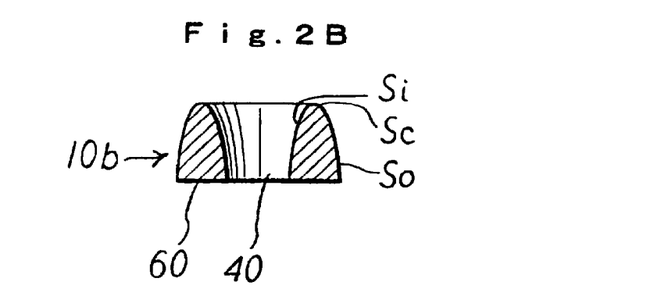
Figure 2C:
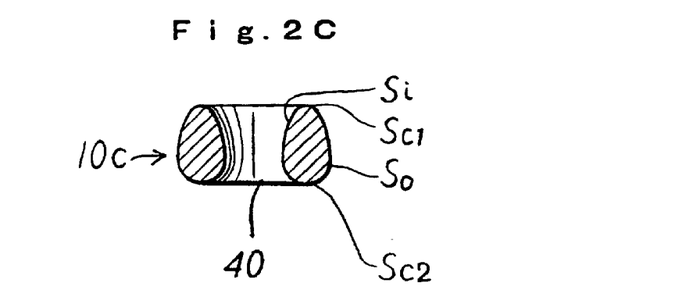

In the carrier 10c depicted in FIG. 2C, the cross-sectional shape containing a rotational symmetry center is an oval shape. In the drawing, the inner peripheral surface $S_i$ defined by the hollow portion 40 and the outer peripheral surface $S_o$ are linked by a curved surface $S_{c1}$ at the top, and a curved surface $S_{c2}$ (whose curvature is greater than that of the curved surface $S_{c1}$) at the bottom.

Figure 2D:
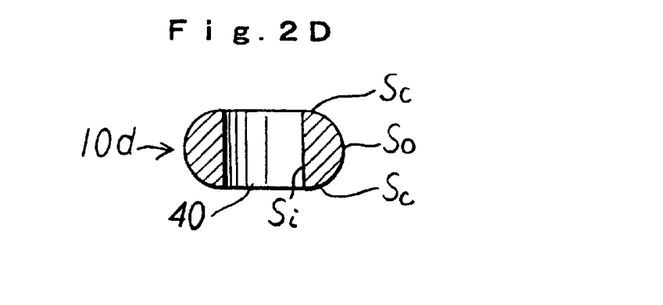

In the carrier 10d depicted in FIG. 2D, the cross-sectional shape containing a rotational symmetry center is a semicircular shape. In the drawing, the annular inner peripheral surface $S_i$ and the outer peripheral surface $S_o$ (which constitutes a curved surface) separated by the hollow portion 40 are linked by curved surfaces $S_c$ at the top and bottom.

Figure 2E:
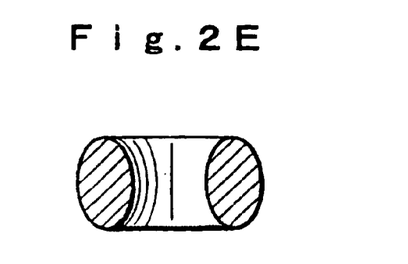
Figure 2F:
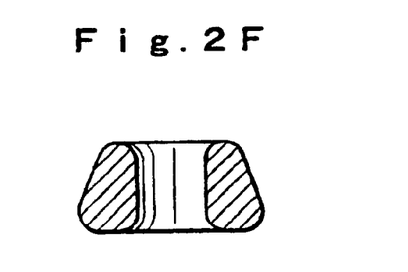
Figure 2G:
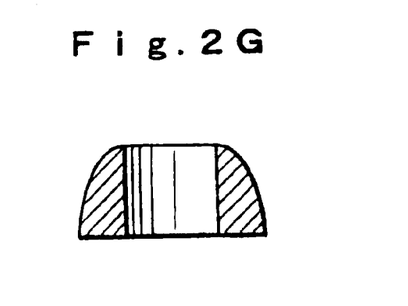

It is also possible to adopt an elliptical shape such as that shown in FIG. 2E or cross-sectional shapes such as those shown in FIGS. 2F and 2G. Of the cross-sectional shapes shown in FIGS. 2A to 2G, the cross-sectional shapes shown in FIGS. 2A, 2C, 2E, and 2F do not have any edges in the portions that link outer peripheral surfaces and inner peripheral surfaces and are completely rounded, so the number of chipped or broken catalyst particles is reduced when the catalyst is packed into a fixed bed, and low resistance is maintained when a reaction fluid is passed, making it possible to further reduce the pressure loss between the upstream and downstream sides of the fixed bed. Alternately, the inner peripheral wall of the carrier may be an annular wall (as shown in FIGS. 2D and 2G), or the top or bottom surface may be flat (as shown in FIG. 2B).

Figure 3A:
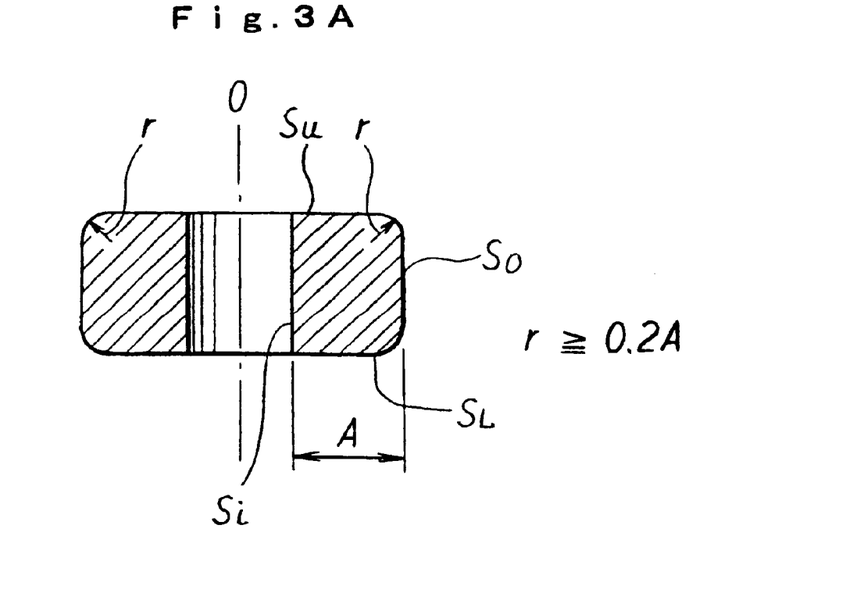
FIGS. 3A and 3B are diagrams illustrating the curvature of the curved surfaces linking the inner peripheral portions and outer peripheral portions of the catalyst carrier pertaining to the present invention.
Figure 3B:
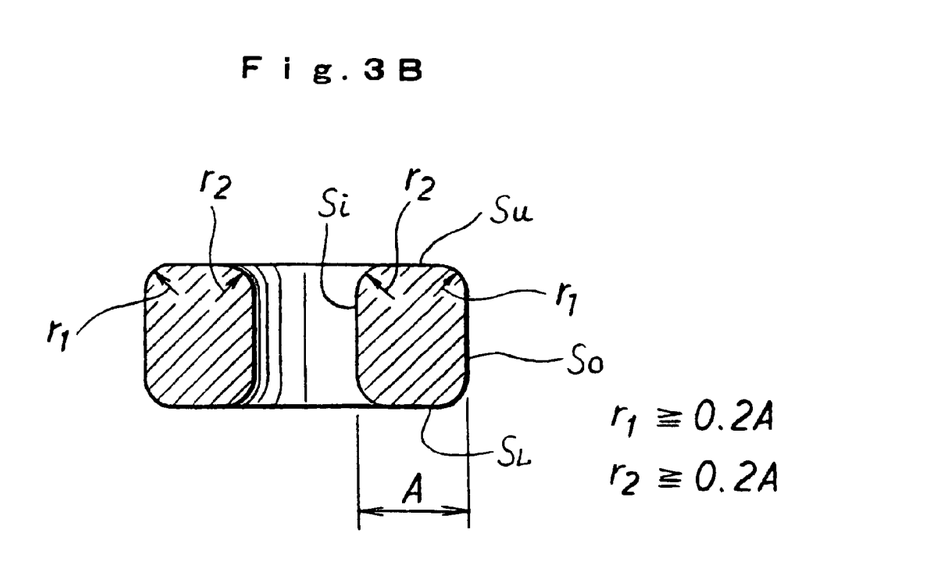

The cross-sectional shapes shown in FIGS. 2A to 2G are merely examples of cross-sectional shapes of the catalyst and catalyst carrier of the present invention. It is also possible to use a quadrangular shape whose corner portions are completely or partially curved, as shown in FIGS. 3A and 3B. Any other shape may also be used as long as it satisfies the requirements for the catalyst or catalyst carrier of the present invention.

The curvature of the portions linking the outer peripheral portion of a carrier with the inner peripheral portion formed by a hollow portion will now be described with reference to a carrier whose shape is shown in FIG. 3A. The catalyst carrier shown in FIG. 3A has a substantially quadrangular cross-sectional shape, and the portions linking the outer peripheral surface $S_o$ with the upper surface $S_u$ and lower surface $S_l$ are formed from curved surfaces, each having a curvature r. In this case, the curvature r should preferably be $0.2A \leq r$ in relation to the width A (half the difference between the outside and inner diameters) in a direction orthogonal to the rotational symmetry axis O because of considerations related to efficient prevention of reaction fluid channeling.

As can also be seen in FIG. 3B, the cross-sectional shape is a substantially quadrangular shape, the portions linking the outer peripheral surface $S_o$ with the upper surface $S_u$ and lower surface $S_l$ are formed from curved surfaces each of which has curvature r1, and the portions linking the inner peripheral surface $S_i$ with the upper surface $S_u$ and lower surface $S_l$ are formed from curved surfaces each of which has curvature r2. In this case, the curvatures r1 and r2 may be the same or different and should preferably satisfy the inequalities $0.2A \leq r1$ and $0.2A \leq r2$ in relation to the width A (difference between the outside and inner diameters) in a direction orthogonal to the rotational symmetry axis O because of considerations related to efficient prevention of reaction fluid channeling. As can be seen in FIGS. 3A and 3B, various cross-sectional shapes such as those shown in FIGS. 2A to 2G can be obtained by appropriately adjusting the curvatures r1 and r2. For example, 2×r1 =2×r2=A in the case of the doughnut shape depicted in FIG. 2A.

The portions linking the inner peripheral surface $S_i$ with the upper surface $S_u$ and lower surface $S_1$ may have this curvature r, instead of providing this curvature r with the portions linking the outer peripheral surface $S_o$ with the upper surface $S_u$ and lower surface $S_l$ in FIG. 3A. In preferred practice, however, the curvature r should be formed around the outside in the manner shown in FIG. 3A in order to prevent catalyst chipping during packing or operation and to achieve even higher efficiency in preventing catalyst plugging. According to another option, which has already been described with reference to the shapes shown in FIGS. 2A to 2G, curvature r should be formed both around the outside and around the inside (as shown in FIG. 3B), providing all the surface-linking portions with curved surfaces. This arrangement smoothes the flow of the reaction fluid through the packed catalyst and makes it possible to prevent channeling with even higher efficiency. A doughnut shape in which the outer peripheral surface, inner peripheral surface, and linking portions are composed of curved surfaces is particularly preferred.

As shown in FIGS. 3A and 3B, the cross-sectional surface area (cross-sectional surface area on one side) is roughly equal to h×A when the cross section containing the rotational symmetry axis is shaped as a rectangle. An increase in the curvature r (formation of a rounded shape) reduces the cross-sectional surface area even further, yielding the result 0.9h×A or less, and particularly 0.8h×A or less. A cross-sectional surface area of 0.6h×A or greater is preferred in order to endow the catalyst with the necessary mechanical strength.

In the carrier whose shape is shown in FIGS. 1 to 3, the hollow portion goes from one end of the carrier to the other in coaxial fashion in relation to the rotational symmetry axis. It is also possible to adopt an arrangement in which one end is closed. It is preferable, however, for the hollow portion to extend through the entire carrier in order to prevent channeling and to reduce pressure loss. In addition, the hollow portion should extend along the rotational symmetry axis, that is, to be parallel to the rotational symmetry axis. It is possible, for example, to provide a plurality of hollow portions extending in a direction parallel to the rotational symmetry axis. These hollow portions should still be extended coaxially with the rotational symmetry axis because of considerations related to the design of control parameters such as porosity and the equivalent spherical diameter, as well as to the ease of shaping, channeling prevention effect, mechanical strength, and the like.

Catalyst and Manufacture Thereof

The catalyst of the present invention can be manufactured by supporting catalytically active components on a catalyst carrier shaped as described above. The active components may be deposited on the surface of the catalyst carrier after the carrier has been formed, or they may be incorporated into the catalyst by being added to the carrier material during the formation of the catalyst carrier. In other words, in some cases the catalytic function may performed solely by the catalyst carrier component. In either case the resulting catalyst has substantially the same shape as the above-described catalyst carrier.

Catalyst dimensions are selected such that the porosity of the catalyst being packed into the below-described reactor is 0.4 or higher, and particularly about 0.45 to 0.6. Dimensions corresponding to an outer diameter $D_o$ of 2 to 10 mm and an inner diameter $D_i$ of about 1 to 6 mm are usually adopted.

It is preferred that catalyst characteristics is such that when the pore distribution is measured by nitrogen adsorption method, the average diameter of pores 600 Å or less in diameter is 40 Å or greater but less than 250 Å, and particularly 60 Å or greater but less than 200 Å. It is also possible to use pores whose diameter exceeds 600 Å which is difficult to measure by the nitrogen adsorption method.

It is preferred that the catalytically active components supported on the carrier should contain at least one Group 6 metal element of the Periodic Table particularly molybdenum and tungsten, at least one Group 9 or 10 element particularly nickel, cobalt, or both. Because of considerations related to desulfurization, denitration, demetallation, and other types of hydrorefining, these components is preferably supported in the following overall amounts, expressed in terms of metal content in relation to the amount of the final catalyst composition: 1 to 15 wt %, specifically 3 to 10 wt % for Group 6 metals, and 0.5 to 5 wt %, specifically 1 to 3 wt % for Group 9 or 10 metals.

Figure 6:
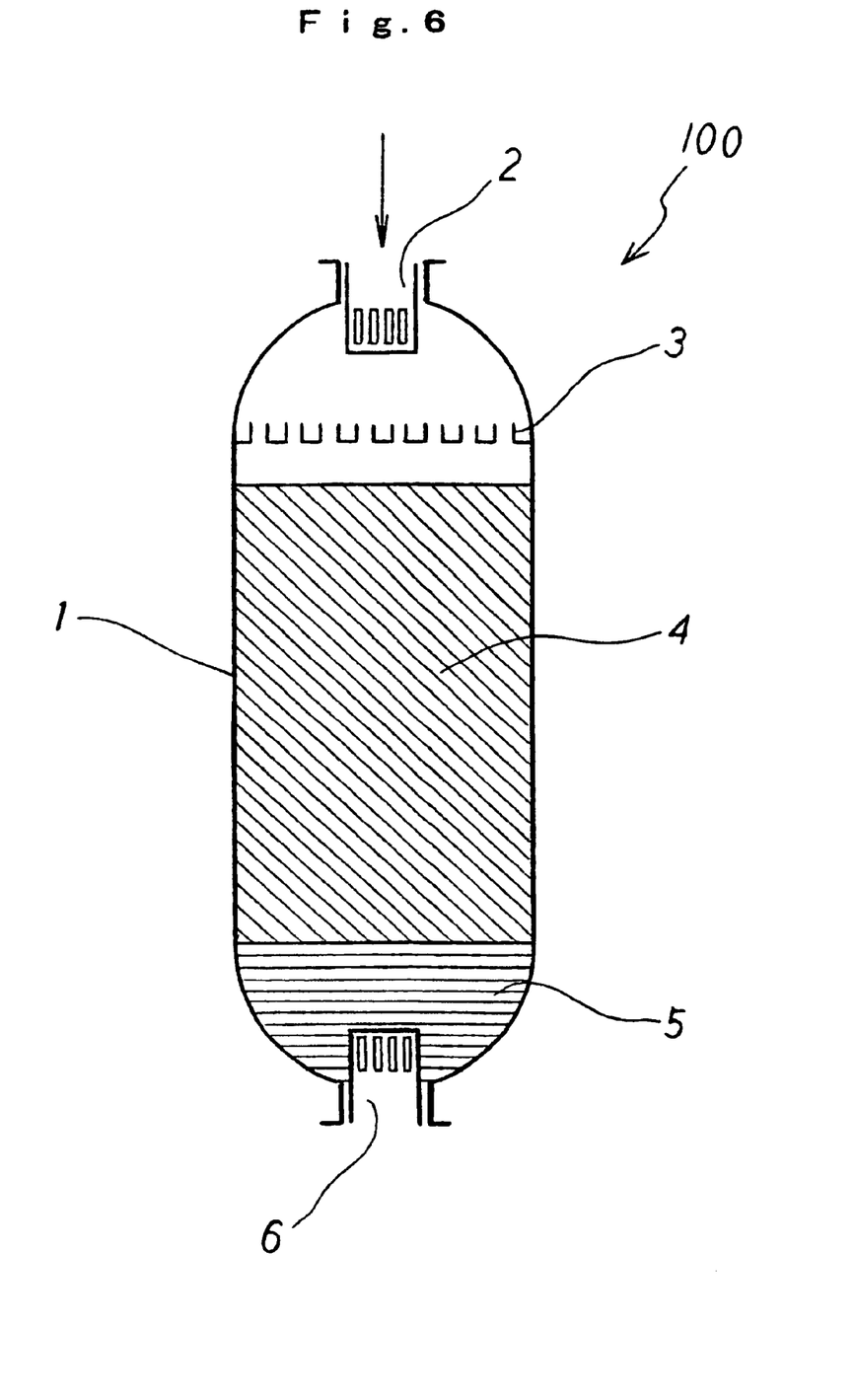
FIG. 6 is a schematic depicting the cross-sectional structure of the hydrogenation reactor pertaining to the present invention.

The hydrogenation reactor pertaining to the present invention will now be described. The reactor of the present invention is provided with a fixed bed packed with the above-described catalyst of the present invention. As shown in FIG. 6, a reactor 100 comprises a columnar reactor 1 provided with an inlet 2 and an outlet 6 at the top and bottom ends, respectively. The reactor 1 houses, successively in the direction from the upstream side to the downstream side, a reaction fluid dispersing device 3, a fixed bed 4, and a supported catalyst or ceramic-ball layer 5. The reaction fluid inlet 2 comprises a liquid inlet and an inlet for hydrogen or another gas. The catalyst of the present invention is packed into the fixed bed 4. In the fixed bed, substantially no catalyst movement occurs when the reaction fluid is fed from top to bottom. In a common reactor, the catalyst tends to be plugged by the granular substances contained in the reaction fluid or the granular substances produced by the catalytic reaction when the reaction fluid is fed downward in this manner, but the reactor 100 of the present invention is packed with the catalyst of the present invention, and is thus less likely to be plugged. The reactor 100 of the present invention may be provided with a plurality of fixed beds 4, or a single bed (mono-bed) may be provided. In particular, the fixed bed of the present invention has adequate durability as a mono-bed because the pressure loss can be kept low and the time to plugging can be extended, as will be apparent from the examples described below.

When a plurality of beds are used, the catalyst of the present invention can still be used with even higher efficiency by packing the catalyst of the present invention into the highest upstream bed of the reaction fluid in the reactor (into the portion where the reaction fluid is initially introduced) when the granular substances in the reaction fluid are apt to precipitate, and to the initial bed thereof when a plurality of reactors are connected in a cascade. In a reactor having multiple beds, the catalyst of the present invention can be packed all over the beds when the reaction fluid has a high concentration of solid particles. In addition, the catalyst layer can be provided with higher overall activity than that achieved in the case of size grading by selecting the packed catalyst such that catalyst porosity gradually decreases in the direction from the upstream side to the downstream side.

The reaction fluid for the catalytic reaction performed using the catalyst of the present invention contains a granular substance. The granular substance has a sufficiently small particle diameter (typically about 1 to 1000 μm, in terms of grain size) in comparison with the catalyst carrier, and can be a solid, a coagulated liquid much more viscous than the reaction fluid, or the like. The granular substance may be contained in the reaction feed stock or may be produced by the reaction. The catalyst and reactor of the present invention should preferably be used for the hydrogenation treatment of petroleum. The hydrogenation treatment may be hydrorefining (desulfurization or the like), hydrogenolysis, hydrodewaxing, isomerization, or the like. The petroleum may be a heavy oil having a fraction of which boiling point is 300° C. or higher in an amount of 10% or higher, that is, a heavy fraction or residue obtained by distilling crude oil, tar sand, shale oil, coal liquid, or the like at atmospheric or reduced pressure, or a heavy oil obtained by subjecting these to decomposition, isomerization, reforming, solvent extraction, or other treatments. The catalyst and reactor of the present invention should preferably be used with heavy oils because these oils contain large amounts of solid particles, that is, granular substances. The catalyst and reactor are also suitable for use with cracked products containing particulate catalysts, such as the slurry oil of a fluidized catalytic cracker.

For example, the following conditions are preferred when heavy oil is hydrogenated using such a catalyst and reactor: a reaction temperature of 300 to 450° C., a hydrogen partial pressure of about 20 to 250kg/cm$^2$, a liquid space velocity of about 0.1 to 10 hr$^{-1}$, and a hydrogen-to-heavy oil ratio of about 100 to 4000 L/L. The following conditions are particularly preferred: a reaction temperature of 350 to 420° C., a hydrogen partial pressure of about 40 to 200 kg/cm$^2$, a liquid space velocity of about 0.2 to 2.0 hr$^{-1}$, and a hydrogen-to-heavy oil ratio of about 500 to 1000 L/L.

Examples

The present invention will now be described in further detail through examples, but these examples do not limit the scope of the present invention in any way.

A blend obtained by adding a nitric acid aqueous solution to a synthetic boehmite as a shaping material was press-formed using a pair of molds, yielding a formed article whose cross-sectional shape is shown in FIG. 2E. This formed article had an outer diameter $D_o$ of 2.8 mm, an inner diameter $D_i$ of 1.0 mm, and a height h of 1.4 mm, and the cross section containing the rotational axis was an ellipsis with a major axis of 1.4 mm and a minor axis of 0.9 mm. This formed article was baked at about 800° C., yielding a catalyst carrier A having substantially the same dimensions as the formed article. The catalyst carrier A had a porosity of about 50%.

Comparison

A commercially available Raschig ring catalyst B with an outer diameter of 3.2 mm, an inner diameter of 1.1 mm, and a height 5.6 mm was obtained as a comparison. Catalyst carrier B was formed as a pipe (hollow cylinder). Catalyst carrier B had the same porosity as catalyst carrier A (about 50%).

Channeling Test

Figure 7A:
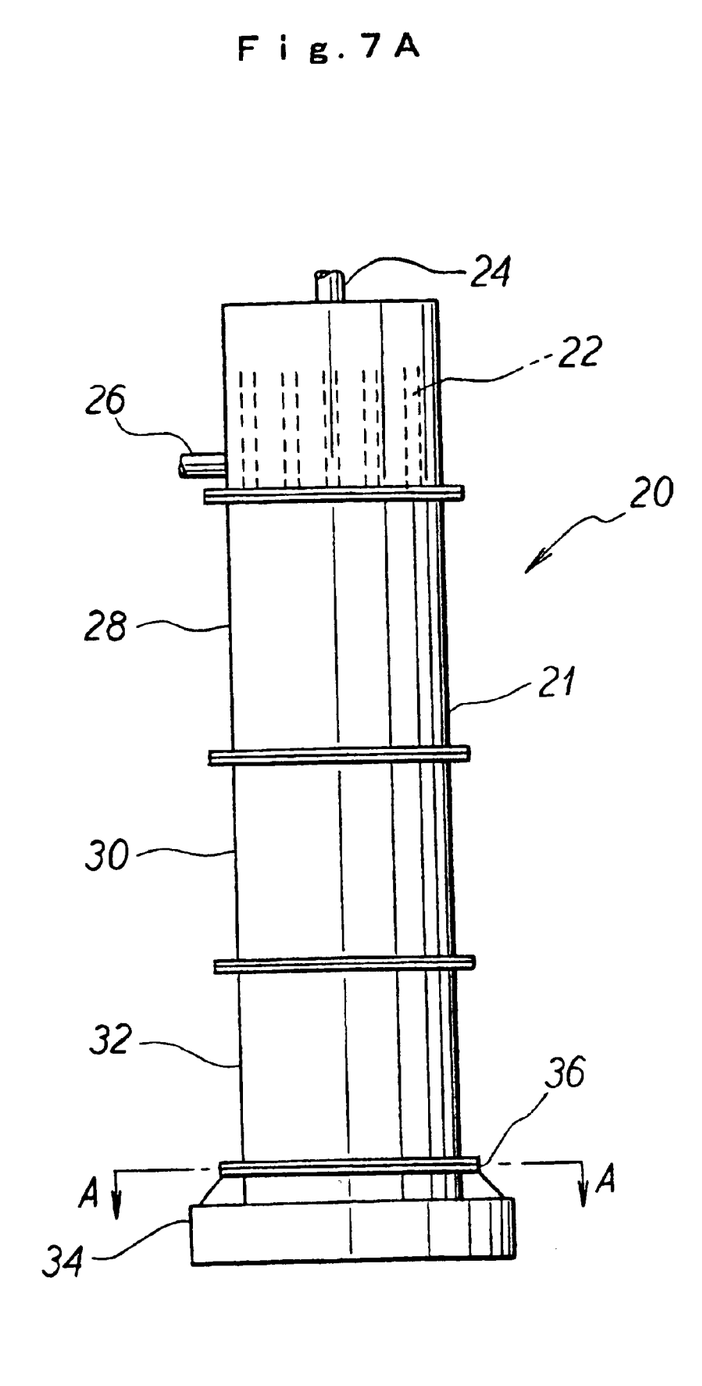
FIGS. 7A and 7B are diagrams depicting the overall structure of an apparatus for evaluating the channeling of a fixed bed obtained using the catalyst carrier of the present invention.
Figure 7B:
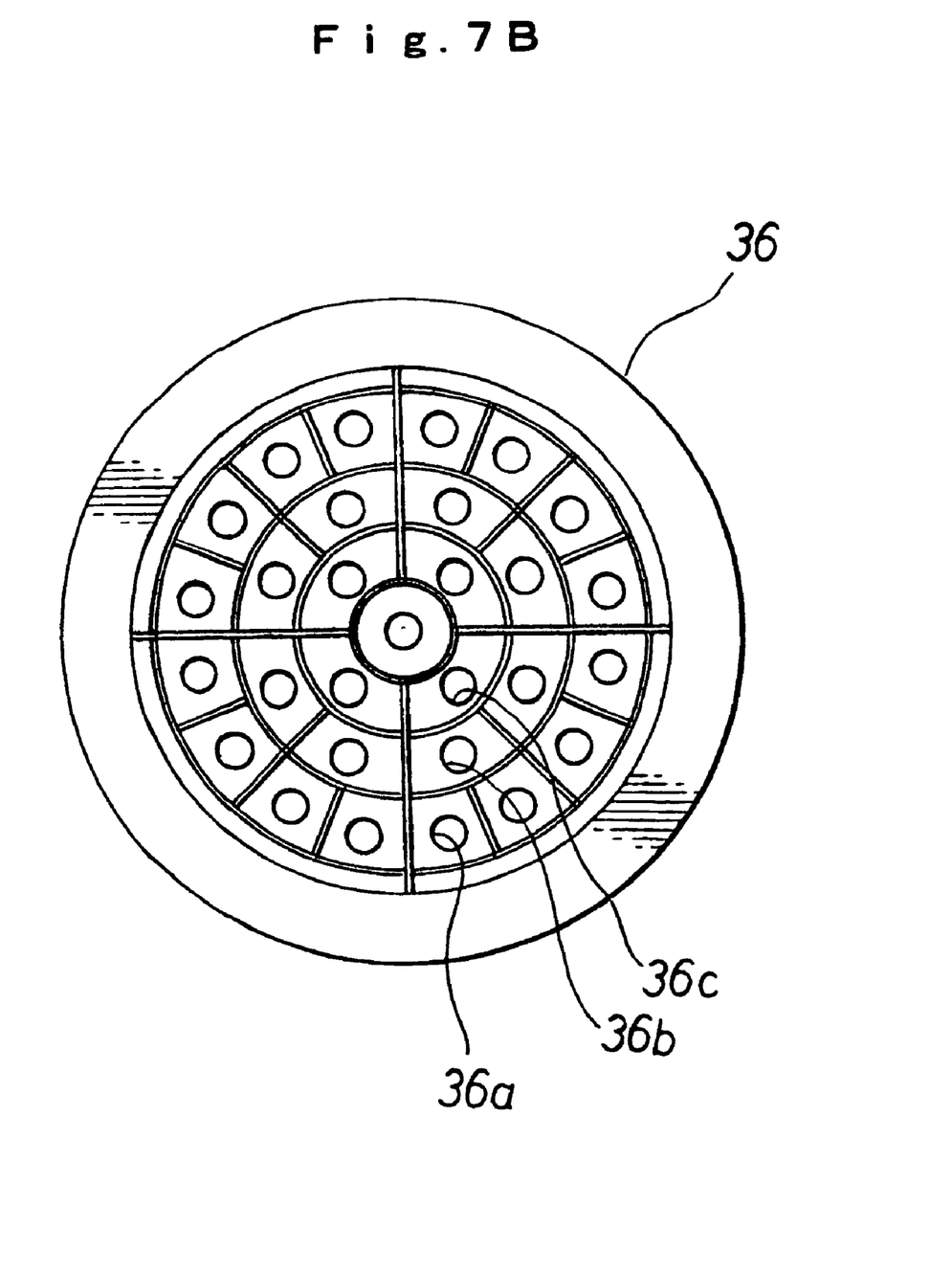

Channeling experiments involving a gas-liquid mixed-phase flow and pertaining to catalyst carriers A and B were performed using a cold-flow model experimental apparatus 20 such as that shown in FIGS. 7A and 7B. In each experiment, the experimental apparatus 20 comprised a cylindrical packed column 21 with an inner diameter of 300 mm, equipped with a gas-liquid dispersing apparatus 22 at the top, and a liquid collector 34 at the bottom. The top portion of the packed column 21 was provided with a liquid inlet 24 for admitting a liquid from above, and a gas inlet 26 for admitting gas from the side. The packed column 21 comprised a first column 28, a second column 30, and a third column 32, linked together in series. In this test, the first column 28 alone was packed with a catalyst carrier. The liquid collector 34, an apparatus for measuring the flow rate distribution of the solution at the outlet from the catalyst carrier layer, was provided with a liquid-collecting plate 36 such as the one shown in FIG. 7B. The liquid-collecting plate 36 was provided with hole-like ducts 36a, 36b, 36c, and the like, arranged concentrically about the center axis of the packed column 21. Each of the ducts was linked to a measuring cylinder (not shown). The catalyst carrier was intentionally dropped in the center of the packed column and packed such that the surface of the catalyst layer sloped in the outer peripheral direction during packing.

The channeling in cases in which catalyst carriers A and B were packed was evaluated with the experimental apparatus 20 in the following manner. Air and water were fed through the liquid inlet 24 and gas inlet 26, respectively. The air and water thus fed were uniformly dispersed in a gas-liquid dispersing apparatus 22 and allowed to descend through the catalyst layer (thickness: 400 mm) packed in the first column 28. The water was guided into the cylinders via the liquid-collecting plate 36. The volume of water collected during a given period by the measuring cylinders in the liquid collector was measured to determine the flow rate distribution of the liquid at the outlet from the catalyst layer, and fluid channeling could be estimated based on this distribution. The flow rates of the water and air were 10.6 L/min and 96 nL/min, respectively.

Figure 4:
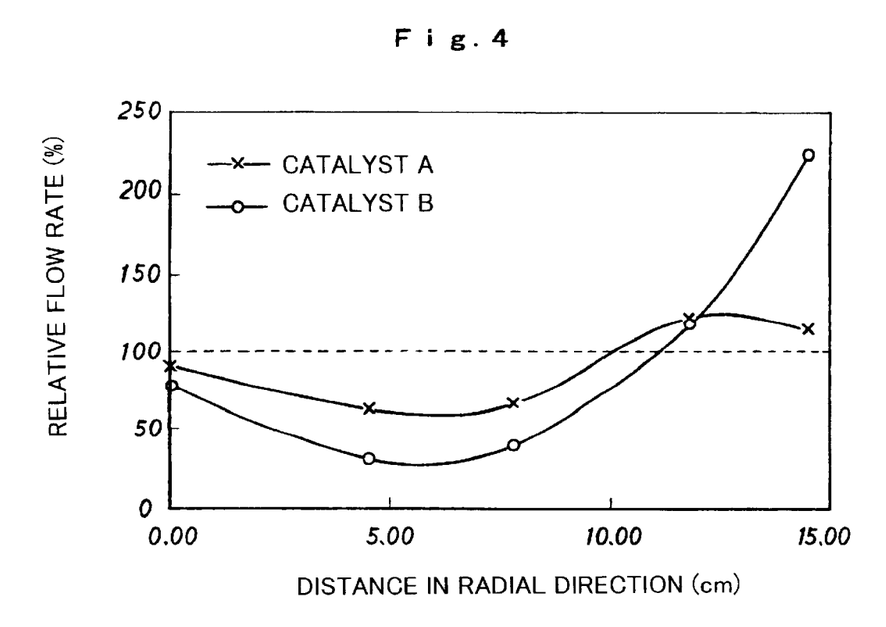
FIG. 4 is a graph illustrating the results of a study into the liquid flow rate distribution versus the radial position of a cold-flow-model experimental apparatus used to simulate catalyst carriers fabricated according to examples and comparisons.

Channeling was evaluated for each of the catalyst carriers A and B thus packed. FIG. 4 depicts distributions of mean solution flow rates versus positions in the radial direction of the packed column for catalyst carriers A and B. In FIG. 4, the mean value of the solution flow rate across the entire outlet surface of the catalyst carrier layer is assumed to be 100% (as plotted on the vertical axis), and each relative flow rate value is expressed as a percentage with respect thereto. It can be seen in FIG. 4 that catalyst carrier B tends to guide the liquid toward the outer periphery and that this tendency is less pronounced in catalyst carrier A. The standard deviation of the solution flow rate at positions in the radial direction is 27.7% for catalyst carrier A and 61.2% for catalyst carrier B, indicating that catalyst carrier A provides better liquid dispersibility than does catalyst carrier B. These experimental results demonstrate that the catalyst carriers used in the present examples provide better liquid dispersibility than do conventional Raschig ring catalysts even when the common commercial sock packing method is used.

Differential Pressure Increase Test

Differential pressure increase experiments involving a gas-liquid mixed-phase flow and pertaining to catalyst carriers A and B were performed using the cold-flow model experimental apparatus employed in the channeling test. A water slurry containing silica with an average particle diameter of 30 μm in a concentration of 1 wt % was used as a simulated feed stock in order to compare the differential pressure increase rate and the accumulation rate of the solid fraction contained in the feed stock. The air and the slurry were uniformly dispersed with the gas-liquid dispersing apparatus provided at the top, caused to descend through a catalyst layer with an inner diameter of 50 mm and a height of 1000 mm at mean flow rates of 4.5 and 0.35 L/min, respectively, and expelled from the system. Variations in the differential pressure of the catalyst layer were measured with a pressure gauge provided to the gas-liquid dispersing apparatus.

Figure 5:
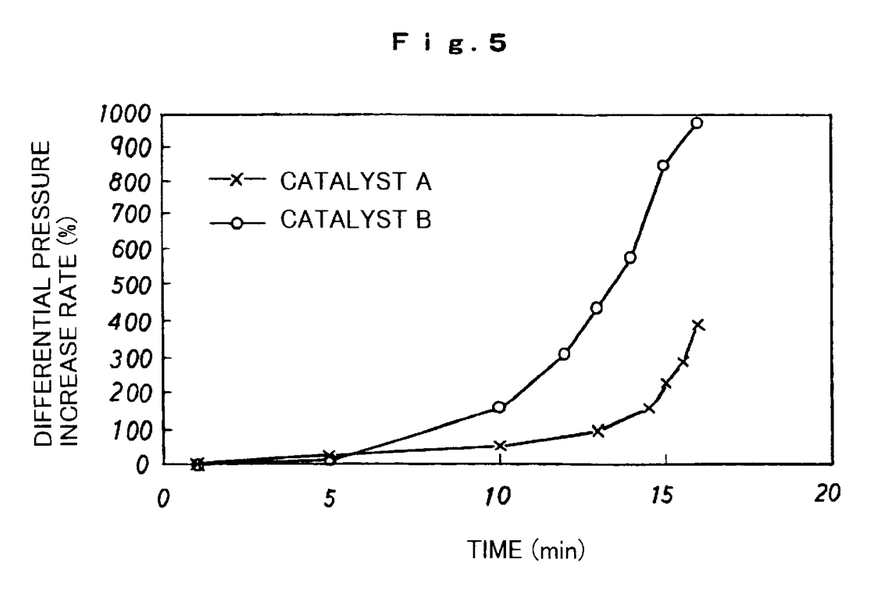
FIG. 5 is a graph illustrating the results of measuring temporal variations in the differential pressure of a cold-flow-model experimental apparatus used to simulate catalyst carriers fabricated according to examples and comparisons.

In FIG. 5, variations in the differential pressure increase rate of catalyst carriers over time are shown in graph form. In FIG. 5, the slurry introduction start time is designated as time 0 (zero), the differential pressure at time 0 is assumed to be 100%, and, using this as reference, the value expressing the subsequent increase in differential pressure is referred to as the differential pressure increase rate. It can be seen in the graph in FIG. 5 that the differential pressure increase of catalyst carrier A is no more than half that of catalyst carrier B. In addition, the rate at which silica accumulates in the catalyst layer after 16 minutes have elapsed is 76.2% for catalyst A and 60.6% for catalyst B. These results demonstrate that the catalyst carrier of the present invention has a low differential pressure increase rate despite the fact that granular substances accumulate at a higher rate than in a conventional Raschig ring catalyst. The time needed for the fixed bed to reach a prescribed differential pressure can thus be extended by employing the catalyst of the present invention for the fixed bed. In other words, catalyst life can be extended using the inventive catalyst.

INDUSTRIAL APPLICABILITY

The catalyst and catalyst carrier of the present invention make it possible to achieve higher porosity and to reduce catalyst channeling by the granular substances contained in the reaction fluid or produced by the reaction. In addition, catalyst life can be extended because the catalyst-induced differential pressure increase is small even when granular substances accumulate on the catalyst. The catalyst carrier of the present invention can also prevent a reaction fluid from undergoing channeling because a prescribed configuration is provided.

Using the hydrogenation reactor and catalytic reaction method in accordance with the present invention makes it less likely that the liquid components of a reaction fluid will undergo channeling. As a result, the reaction fluid achieves uniform contact with a catalyst close-packed into a fixed bed, increasing catalytic reaction efficiency. Because the reactor and the reaction method of the present invention can reduce pressure loss, the operating period can be extended without plugging the space between catalyst particles when granular substances contained in heavy oil and other types of reaction fluid accumulate on the catalyst. In addition, the low pressure loss makes it less likely that the catalyst will be lifted up when gas is admitted from beneath the catalyst layer, making it possible to introduce gas and liquid as a counterflow. Adapting this counterflow to a fixed bed for the hydrogenation of heavy oil or the like makes it possible to prevent hydrogen sulfide or other reaction poisons from accumulating in the area of the lower layer of the fixed bed, and to further increase the efficiency and service life of the fixed bed.

In addition, lowering the pressure loss in the fixed bed makes it possible to achieve increased reactor length and to use the product in a mono-bed. Another benefit is that there is no need to provide the reactor with a dispersing apparatus because the reaction fluid can be prevented from channeling.

Still another benefit is that the reaction serving as the rate determining step for the diffusion inside catalyst pores can be promoted by reducing the equivalent diameter of the catalyst while keeping the pressure loss at the same level as in the past.

What is claimed is:

1. A hydrogenation catalyst having a carrier composed of a refractory inorganic oxide and a catalyst component supported thereon, wherein:

the hydrogenation catalyst has rotational symmetry and a hollow portion formed along a rotational symmetry axis;

an outer peripheral surface, and the inner peripheral surface defined by the hollow portion are linked by curved surfaces; and a height of the catalyst along the rotational symmetry axis is less than an outer diameter of the catalyst.

2. A hydrogenation catalyst as defined in claim 1, wherein the inner diameter of the hollow portion is 0.5 to 3 times the height of the catalyst in the direction of the rotational symmetry axis.

3. A hydrogenation catalyst as defined in claim 2, wherein the height of the catalyst in the direction of the symmetry axis is 0.2 to 0.6 times the outer diameter of the catalyst.

4. A hydrogenation catalyst as defined in any on of claims 1 to 3, wherein the outer peripheral surface and the inner peripheral surface are formed of curved surfaces, respectively.

5. A hydrogenation catalyst as defined in any one of claims 1 to 3, wherein the hollow portion is formed coaxially with the rotational symmetry axis.

6. A hydrogenation catalyst as defined in any one of claims 1 to 3, wherein the cross section containing the rotational symmetry axis has a configuration selected from a group consisting of circular, elliptical, semicircular, semi-elliptical, oval, fan-like, and quarter-elliptical shapes, as well as a quadrangular shape having curved corner portions.

7. A hydrogenation catalyst as defined in any one of claims 1 to 3, having a doughnut shape.

8. A hydrogenation catalyst defined in claim 1, wherein the catalyst carries at least one element of Group 6 metal elements of the Periodic Table and at least one element of Group 9 or 10 elements of the Periodic Table, and a total amount of the at least one element of Group 6 metal elements is 1 to 15 wt % in terms of metal content and a total amount of the at least one element of Group 9 or 10 metal elements is 0.5 to 5 wt % in terms of metal content.

9. A hydrogenation reactor, comprising a fixed bed packed with a catalyst as defined in claim 8.

10. A hydrogenation reactor as defined in claim 9, wherein a mixed gas-liquid phase is present inside the fixed bed.

11. A hydrogenation reactor as defined in claim 10, wherein a reaction fluid fed into the hydrogenation reactor contains a granular substance.

12. A hydrogenation reaction apparatus as defined in claim 10, wherein a reaction fluid fed into the hydrogenation reactor is heavy oil.

13. A catalytic reaction method, wherein a reaction fluid containing a granular substance is fed into a fixed bed packed with a catalyst as defined in claim 8, so that a catalytic reaction is performed.

14. A catalytic reaction method as defined in claim 13, wherein the reaction fluid contains petroleum distillate, and the catalytic reaction is a hydrogenation treatment.

* * * * *

UNITED STATES PATENT AND TRADEMARK OFFICE
CERTIFICATE OF CORRECTION

PATENT NO.    : 6,325,919 B1
DATED         : December 4, 2001
INVENTOR(S)   : Hiroki Koyama et al.

It is certified that error appears in the above-identified patent and that said Letters Patent is hereby corrected as shown below:

Title page,
Item [22], PCT Filed:, please change the date from "Oct. 15, 1998" to
-- Oct. 14, 1998 --.
Item [56], References Cited, FOREIGN PATENT DOCUMENTS, please change "1323064   7/1973   (JP)" to -- 1323064   7/1973   (GB) --.

Signed and Sealed this

First Day of October, 2002

Attest:

Attesting Officer

JAMES E. ROGAN
Director of the United States Patent and Trademark Office